Patented Dec. 11, 1934

1,984,246

UNITED STATES PATENT OFFICE 1,984,246

CAOUTCHOUC-LIKE MATERIAL

Robert Beyer, Brooklyn, N. Y., assignor to Robert Beyer Corporation, a corporation of New York No Drawing. Application December 14, 1929, Serial No. 414,217. Renewed November 9, 1934

15 Claims. (Cl. 260—6)

This invention relates to caoutchouc-like material and has for its object the provision, as a new article of manufacture, of a novel caoutchouc-like material, and a method of making the same.

I have heretofore discovered that starch can be converted into a caoutchouc-like material which behaves in substantially all important respects like natural caoutchouc, and in my copending United States patent applications, Serial No. 395,763, filed September 27, 1929, and Serial No. 424,129, filed January 28, 1930, I have described and claimed certain inventions based on that discovery. Briefly, the fundamental stages in that conversion involves treatment of the starch with water containing in solution one or more chlorides such as calcium chloride and zinc chloride, and coagulation of the caoutchouc-like conversion product. I have now discovered that the conversion of the starch into a caoutchouc-like material can be substantially promoted by active fermentation of the starch in the presence of water and certain soluble salts, probably assisted by bacterial action, and that coagulation of the caoutchouc-like conversion product is effected, in large part at least, in the course of the fermentation and/or bacterial action.

The method of my present invention, based on these discoveries, involves subjecting starch or a starchy carbohydrate substance to active fermentation in the presence of appropriate bacteria and one or more appropriate salts (preferably chlorides) and water, and recovering the resulting caoutchouc-like material. The method of the invention may be carried out in various ways. By way of illustration, I will describe my present preferred practice, concluding with a specific example thereof. It is to be understood, however, that I do not intend or wish to be restricted to or bound by any explanations of reactions or phenomena which I give in an attempt to elucidate my present conception of the conversion process.

All starches appear available to some extent for the practice of the invention, but certain starches give far better practical results than others. I have obtained very satisfactory results with potato starch, cassava starch, and starches of similar nature. The starch is first mixed with sufficient water to wet and swell all of the starch grains. An aqueous solution of one or more appropriate salts is then added to the mass. Chlorides appear to be the most suitable salts for the purpose, and it is now my preferred practice to use an aqueous solution of calcium chloride and zinc chloride. The mixing of the starch with water and the aqueous saline solution may be effected in any appropriate type of apparatus. Active fermentation is now induced in the mixed mass. Any appropriate receptacle may be used for holding the mass during fermentation such, for example, as an earthenware vessel. Fermentation may be advantageously initiated by the introduction of any appropriate ferment, ordinary compressed or baker's yeast being satisfactory. During fermentation, the mass is protected from extremes of temperature. In practice, I have found that fermentation proceeds satisfactorily for the purposes of the invention when the mass is maintained at a temperature of 50 to 60° F.

Coagulation takes place within the mass coincidently with or subsequently to fermentation, probably promoted by bacterial action, and progresses gradually until there results a relatively large yield of agglomerations of coagulated caoutchouc-like material. Both the conversion and coagulation appear to be progressive operations. From my researches and investigations, it appears that the conversion of the carbohydrate starch molecule to the hydrocarbon caoutchouc-like molecule begins to take place as soon as the starch is mixed with water and the chlorides, and continues progressively until most of the available or amenable starch has been reacted upon. It also appears probable that coagulation of the caoutchouc-like conversion product begins to take place promptly after the initial formation of the product, although it becomes more visibly apparent after active fermentation has set in. The milky liquor produced after several days' active fermentation is rather foul-smelling and contains unconverted starch, partially converted starch, colloidal caoutchouc-like material and coagulated caoutchouc-like material. The fermentation is continued until an economically satisfactory yield of the caoutchouc-like material has been coagulated, and may be continued until coagulation of caoutchouc-like material practically ceases.

The agglomerates of coagulated caoutchouc-like material rise and float in the liquid mass and may be removed or separated from the mass in any appropriate manner. The removal of the agglomerates may take place from time to time during the course of the fermentation or may await the completion of the fermentation operation. The agglomerates are washed, preferably on an appropriate rubber mill, and may advantageously be dried and sheeted also on a rubber mill.

I now give a specific example of my preferred practice of the invention, although it is to be understood that this example is purely illustrative and in no sense restrictive. The materials and proportions specified are those with which I have secured very satisfactory results in actual practice.

Five pounds of potato or cassava starch are mixed with one gallon of water. The mixing is carried on until the water is thoroughly and uniformly incorporated throughout the mass of the starch. A cold aqueous solution made up of 4½ pounds of calcium chloride and 1¼ pounds of zinc chloride dissolved in one gallon of water is then added to the mass with constant stirring. One or more compressed yeast cakes, mixed in water, are then incorporated in the mass, and the mass is then allowed to stand in an earthenware vessel at ordinary room temperature for several days. The coagulated material is separated from the mass, washed, dried and sheeted on a rubber mill.

Under certain circumstances I have found it advantageous to initiate fermentation of the starch suspended in water before adding the solution of the salts. In any case the reaction mass should be frequently stirred until it assumes a milky emulsion-like state. As the biochemical reactions progress, coagulation takes place within the mass, and the coagulated material rises to the surface. Coagulation may be expedited by introducing the emulsion product resulting from the bio-chemical processes into a dilute acid solution, such for example as a 5 to 10% aqueous solution of formic acid.

The caoutchouc-like material produced in accordance with the method of the invention displays both chemical and physical characteristics remarkably similar to those of natural caoutchouc. Upon vulcanization, it produces a product possessing good tensile strength, good elasticity and good ageing qualities. Vulcanization takes place substantially faster than in the case of natural caoutchouc. A possible explanation of the acceleration of the rate of cure may be accounted for by the presence in the material of nitrogenous and possibly albuminous substances originating in the starch. Unlike natural caoutchouc, the material of the invention is substantially neutral, its water extract giving neither an acid nor alkaline reaction. Chemically, the caoutchouc-like material of the invention is a hydrocarbon with which is associated about the same small percentage of other substances as in natural caoutchouc. In other words, the hydrocarbon and non-hydrocarbon constituents are present in the material of the invention in substantially the same relative proportions as in the natural caoutchouc.

When produced under favorable conditions in accordance with my present preferred practice, the hydrocarbon content of the material has a molecular structure identical with natural caoutchouc. Thus, when subjected to the X-ray examination described by George L. Clark in the India Rubber World of February 1, 1929, pages 55–59, this caoutchouc-like material displays a diffraction pattern identical with that of natural caoutchouc as illustrated in Fig. 2 of that article. This X-ray examination shows the complete absence in the material of the invention of any carbohydrate, thus demonstrating the complete conversion of the carbohydrate of starch to the hydrocarbon of caoutchouc.

I am unable to give any fully-proven explanation of the reactions and phenomena taking place in the course of the process. It appears probable that the fermentation provides or forms an enzyme or enzymes which promote the growth of certain bacteria whose action upon the starch in the presence of the mixed chlorides produces a conversion from carbo-hydrate to hydrocarbon. This bacterial action is probably accompanied by the formation of acids which aid in the coagulation of the caoutchouc-like material. The mother liquor at the completion of natural coagulation (unaided by extraneously added acid) shows the presence in almost a pure culture of bacteria having the appearance of a diplococcus. This mother liquor also contains few active yeast cells. From this it would appear that the yeast cells having performed their function of preparing a proper enzyme are no longer necessary and find it difficult to exist under the increasing acid conditions. No attempt is made to exclude other bacteria during the bio-chemical processes, but the multiplication of the one diplococcus form appears to kill off other bacteria which would normally be present in such a reaction mass.

Different starches and starchy carbohydrates respond somewhat differently to the method of the invention. It is my present belief that all starchy carbohydrate substances are converted, to some extent at least, by the method of the invention, to a caoutchouc-like hydrocarbon material. Certain starches unquestionably respond more readily and more completely than others, but the outstanding differences I have observed in actual practice are of degree rather than substance, and are usually evidenced by differing susceptibilities to fermentation, different ultimate yields and different rates of conversion. I have obtained the highest yields and the optimum rates of conversion with potato, cassava and similar starches.

I claim:

1. The method of making a caoutchouc-like material which comprises subjecting starch in the presence of water and a soluble metallic chloride adapted to form a mucilaginous mass to a yeast fermentation action at temperatures not substantially higher than room temperatures until the starch is converted into a caoutchouc-like material, and recovering the caoutchouc-like material from the resulting mass.

2. The method of making a caoutchouc-like material which comprises subjecting starch in the presence of water and calcium chloride to a yeast fermentation action at temperatures not substantially higher than room temperatures until the starch is converted into a caoutchouc-like material, and recovering the caoutchouc-like material from the resulting mass.

3. The method of making a caoutchouc-like material which comprises subjecting starch in the presence of water and zinc chloride to a yeast fermentation action at temperatures not substantially higher than room temperatures until the starch is converted into a caoutchouc-like material, and recovering the caoutchouc-like material from the resulting mass.

4. The method of making a caoutchouc-like material which comprises subjecting starch in the presence of water and calcium chloride and zinc chloride to a yeast fermentation action at temperatures not substantially higher than room temperatures until the starch is converted into a caoutchouc-like material, and recovering the caoutchouc-like material from the resulting mass.

5. The method of making a caoutchouc-like material which comprises subjecting a starchy carbohydrate substance in the presence of water and a soluble metallic chloride adapted to form a mucilaginous mass to a yeast fermentation action at temperatures not substantially higher than room temperatures until a coagulated caoutchouc-like hydrocarbon material is formed, and recovering the coagulated caoutchouc-like material.

6. The method of making a caoutchouc-like material which comprises subjecting a starchy carbohydrate substance in the presence of water and one or more soluble metallic chlorides adapted to form a mucilaginous mass to a yeast fermentation action at temperatures not substantially higher than room temperatures until a coagulated caoutchouc-like hydrocarbon material is formed, and recovering the coagulated caoutchouc-like material.

7. The method of making a caoutchouc-like material which comprises subjecting a starchy carbohydrate substance in the presence of water and calcium chloride to a yeast fermentation action at temperatures not substantially higher than room temperatures until a coagulated caoutchouc-like hydrocarbon material is formed, and recovering the coagulated caoutchouc-like material.

8. The method of making a caoutchouc-like material which comprises subjecting a starchy carbohydrate substance in the presence of water and zinc chloride to a yeast fermentation action at temperatures not substantially higher than room temperatures until a coagulated caoutchouc-like hydrocarbon material is formed, and recovering the coagulated caoutchouc-like material.

9. The method of making a caoutchouc-like material which comprises subjecting a starchy carbohydrate substance in the presence of water and calcium chloride and zinc chloride to a yeast fermentation action at temperatures not substantially higher than room temperatures until a coagulated caoutchouc-like hydrocarbon material is formed, and recovering the coagulated caoutchouc-like material.

10. The method of making a caoutchouc-like material which comprises mixing starch with sufficient water to wet and swell the starch grains, adding an aqueous solution of one or more soluble metallic chlorides adapted to form a mucilaginous mass to the resulting mixture maintained at temperatures not substantially higher than room temperatures, inducing active fermentation of the mass by incorporating a yeast ferment therein, whereby in the course of the fermentation a caoutchouc-like material is formed and coagulated within the mass, and recovering the coagulated caoutchouc-like material from the mass.

11. The method of making a caoutchouc-like material which comprises mixing starch with sufficient water to wet and swell the starch grains, adding an aqueous solution of calcium chloride to the resulting mass, inducing active fermentation of the mass while maintained at temperatures not substantially higher than room temperatures by incorporating a yeast ferment therein, whereby in the course of the fermentation a caoutchouc-like material is formed and coagulated within the mass, and recovering the coagulated caoutchouc-like material from the mass.

12. The method of making a caoutchouc-like material which comprises mixing starch with sufficient water to wet and swell the starch grains, adding an aqueous solution of zinc chloride to the resulting mass, inducing active fermentation of the mass while maintained at temperatures not substantially higher than room temperatures by incorporating a yeast ferment therein, whereby in the course of the fermentation a caoutchouc-like material is formed and coagulated within the mass, and recovering the coagulated caoutchouc-like material from the mass.

13. The method of making a caoutchouc-like material which comprises mixing starch with sufficient water to wet and swell the starch grains, adding an aqueous solution of calcium chloride and zinc chloride to the resulting mass, inducing active fermentation of the mass while maintained at temperatures not substantially higher than room temperatures by incorporating a yeast ferment therein, whereby in the course of the fermentation a caoutchouc-like material is formed and coagulated within the mass, and recovering the coagulated caoutchouc-like material from the mass.

14. The method of making a caoutchouc-like material which comprises subjecting starch in the presence of water and one or more soluble metallic chlorides adapted to form a mucilaginous mass to yeast fermentation and bacterial action while the mixture is maintained at temperatures not substantially higher than room temperatures in the course of which a caoutchouc-like material is formed, and coagulating and recovering the caoutchouc-like material.

15. The method of making a caoutchouc-like material which comprises subjecting starch in the presence of water and one or more soluble metallic chlorides adapted to form a mucilaginous mass to yeast fermentation accompanied by the action of bacteria diplococcus while the mixture is maintained at temperatures not substantially higher than room temperatures and in the course of the resulting bio-chemical actions converting the starch into a caoutchouc-like material, and coagulating and recovering the caoutchouc-like material.

ROBERT BEYER.